United States Patent
Kopylov et al.

(10) Patent No.: US 8,212,821 B1
(45) Date of Patent: Jul. 3, 2012

(54) DECOMPOSING ANIMATIONS INTO PRIMITIVES FOR BROWSER-DEPENDENT RENDERING

(75) Inventors: Igor Kopylov, Brooklyn, NY (US); Alexander Paul Favaro, Bronxville, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/273,629

(22) Filed: Oct. 14, 2011

(51) Int. Cl.
*G06T 13/00* (2011.01)

(52) U.S. Cl. .......................... 345/473; 345/418; 345/419

(58) Field of Classification Search .................. None
See application file for complete search history.

(56) References Cited

U.S. PATENT DOCUMENTS

| | | | |
|---|---|---|---|
| 6,396,500 | B1 | 5/2002 | Qureshi et al. |
| 2004/0202052 | A1* | 10/2004 | Lev .............................. 368/76 |
| 2005/0108691 | A1* | 5/2005 | Lau et al. ...................... 717/136 |
| 2009/0044123 | A1 | 2/2009 | Tilton et al. |
| 2009/0119597 | A1 | 5/2009 | Vaughan et al. |
| 2009/0315894 | A1 | 12/2009 | Goodwin |
| 2010/0013842 | A1 | 1/2010 | Green et al. |
| 2010/0045662 | A1 | 2/2010 | Boothroyd et al. |

OTHER PUBLICATIONS

Comparison of Web-based Graphics: Formats and Compatibility issues, William Rosener, Northeastern University, The 2006 Oklahoma Higher Education Teaching & Learning Conference, Tahlequah, OK, Apr. 20, 2006 (http://arapaho.nsuok.edu/~rosener/papers/graphics/graphics.html, last visited Oct. 12, 2011).

* cited by examiner

*Primary Examiner* — Said Broome

(57) ABSTRACT

A method for computer-implemented rendering of an animation presentation includes receiving, at a server, a request to view the animation presentation on a computing device, obtaining information identifying a browser application running on the computing device, determining requirements of a presentation technology supported by the browse, decomposing the animation presentation into animation primitives compatible with the presentation technology, and transmitting the animation primitives to the computing device. A computer-implemented method to render an animation presentation include replacing an animation type within an animation page structure of the animation presentation with an animation primitive, flattening the animation, updating the animation page drawing objects to point to the rendered document module object, grouping the animation primitives into sequences to create a timeline for the animation page, and adjusting delays of the animations so as to begin at a correct point in time. A system for implementing the rendering of animations is described.

24 Claims, 9 Drawing Sheets

DECOMPOSING ANIMATIONS INTO PRIMITIVES FOR BROWSER-DEPENDENT RENDERING

FIELD OF DISCLOSURE

The present disclosure relates generally to rendering animations on a computing device, and in particular to decomposing the animation into primitives for browser-dependent rendering.

BACKGROUND

Presentation software typically allows objects to be animated in a large number of ways. An object's position, rotation, scale, color, etc. can all be animated, and a single animation may manipulate multiple properties simultaneously. This poses a problem for web-based presentation software, because not all web browsers may be able to render all possible animations. Even if browsers support a particular animation, different browsers may have different mechanisms for supporting it. For example, some browsers support animations using Synchronized Multimedia Integration Language (SMIL), a markup language for describing multimedia presentations, while others support animation via Javascript. Because of these browser inconsistencies, a different implementation of each animation may need to be created for each browser.

In the viewer, some level of animation support is necessary for all browsers. If the browser supports Scalable Vector Graphics (SVG), where images and their behaviors are defined in XML text files, the full range of animations can be available. If not, the animations will be limited to what can be achieved by cross-fading two Portable Network Graphics (PNG) images (e.g. incremental reveal). The animation framework needs to be flexible enough to support at least these two cases.

It is important for text to be animatable in the same way as any shape. That is, text should be move-able, scalable, rotate-able, etc. Also, since animations can iterate 'by paragraph' or 'by word', these effects should be applicable to any portion of the text. This requirement has some consequences for the SVG rendering.

In the editor, though the rendering is done with SVG, text is rendered using a <canvas> element. This is necessary for rendering text quickly during wysiwyg ("What You See Is What You Get") editing, but since the canvas is a pixel buffer, it does not scale with the rest of the SVG rendering. To get around this limitation, the editor has logic to re-render every canvas when the document is scaled. The same logic would be necessary in the viewer if canvas text was used.

Furthermore, for parts of text to be separately animatable, each part would need to be rendered to its own canvas. Managing all of these canvases and re-rendering them when they need to be scaled would significantly increase the complexity of the viewer. Fortunately, in the viewer, the wysiwyg editing requirement disappears, and the text can be replaced with SVG paths. The down-side of this approach is that the text paths cannot be generated on the client. That is, producing an SVG rendering with animatable text always requires a request to the server.

DETAILED DESCRIPTION

To provide an overall understanding of the invention, one or more embodiments will now be described, including systems and methods for rendering animations on a variety of browser applications resident on computing devices by a server. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
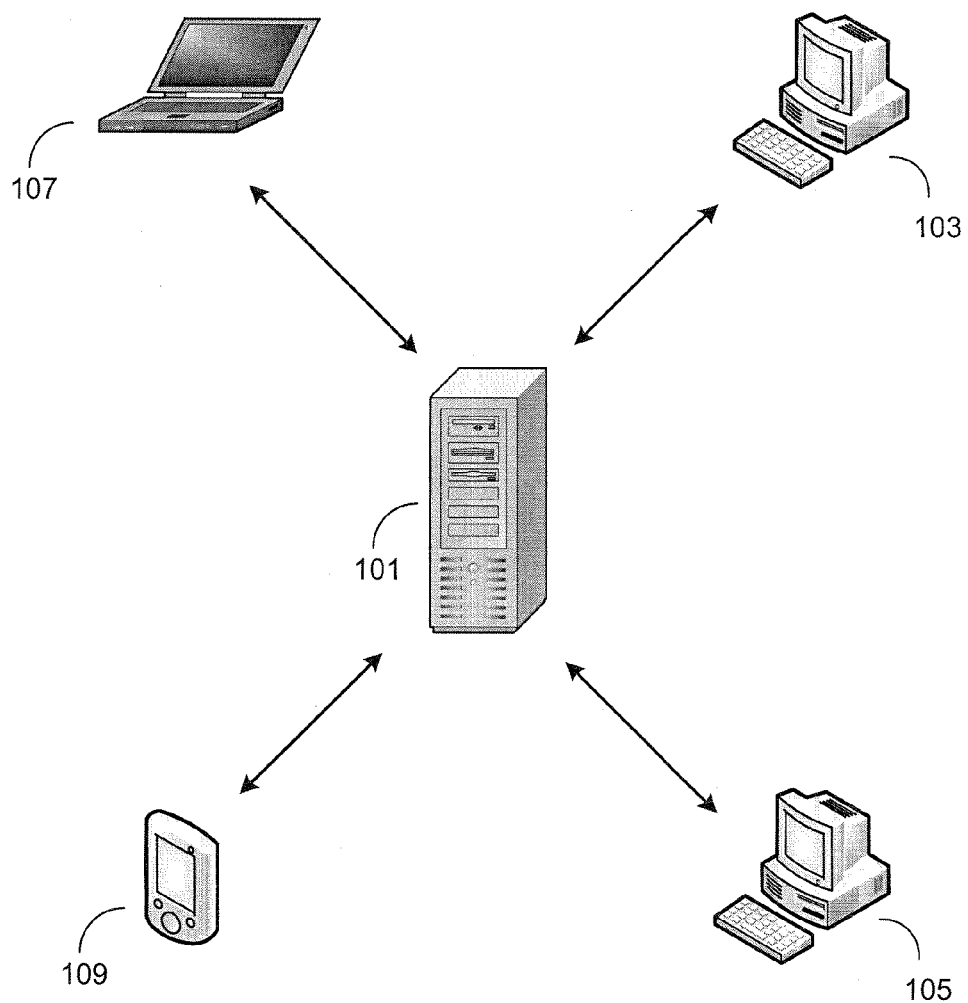
FIG. 1 illustrates a client-server system in accordance with an embodiment of the invention.

FIG. 1 depicts a client-server system suitable for rendering animations. Client-server system 100 includes a server 101 and multiple client computing devices 103 through 109. These client computing devices may include desktop computers 103, 105, laptop computer 107, and handheld electronic device 109. Computing devices that can be used in client-server system 100 are not limited to the devices depicted in FIG. 1 and can encompass a wide variety of devices. Each computing device can communicate with server 101 through connection to an electronic communication network. The devices can communicate with the server through a local area network (LAN), wide area network (WAN), an Internet connection, or any other form of electronic communication. Each computing device in system 100 has an Internet browser installed on it. Internet browsers allow computing devices to view web pages on the Internet. Examples of Internet browsers include Google Chrome, Microsoft Internet Explorer, and Mozilla Firefox, but the types of Internet browsers contemplated are not limited to the ones listed. Server 101 can store animation presentations that can be accessed by any computing device in system 100. One or more users can access the server 101 through the computing devices to view and edit the animation presentations, with suitable permissions. Server 101 controls rendering of these animation presentations on the computing devices to ensure uniform appearance regardless of the specific presentation technology supported by the browser application. Although illustrated as a single device in FIG. 1, server 101 may be implemented as, for example, a single computing device or as multiple distributed computing devices.

Figure 2:
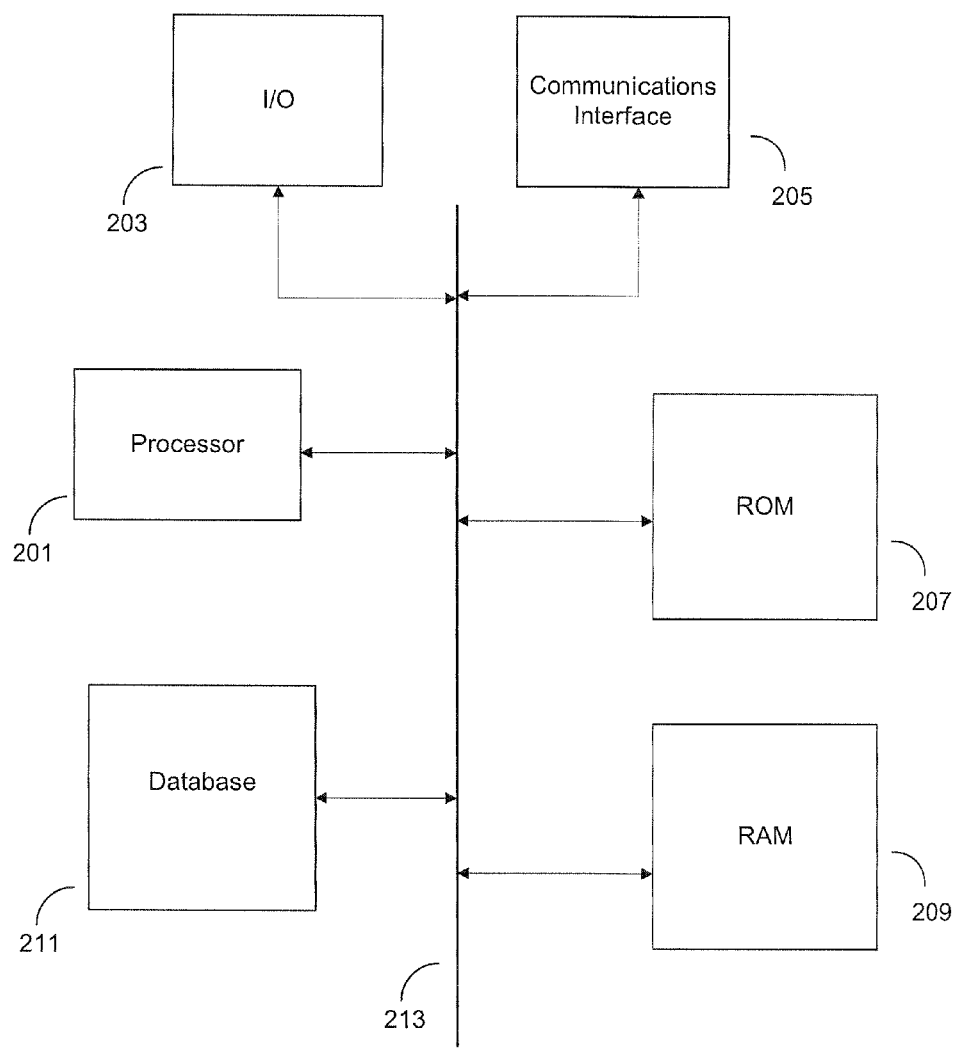
FIG. 2 illustrates a server component diagram in accordance with an embodiment of the invention.

The server in client-server system 100 will now be discussed in greater detail. FIG. 2 depicts a server 200 which includes a processor 201, input and output devices 203, a communications interface 205, read-only memory (ROM) 207, random access memory (RAM) 209, database 211, and bus 213. The bus 213 enables every component in server 200 to electronically communicate with each other. Input/output devices 203 may include a keyboard, mouse, display screen, touchpad, speakers, or any other compatible input or output device. Communications interface 205 may be a network connection, Internet connection, or any other type of electronic communication component. In one embodiment, the communications interface 205 can communicate with multiple client computing devices, such as desktop computers 103, 105, laptop 107, and handheld device 109. Database 211 can store electronic animation presentations that can be accessed by client computing devices through communications interface 205. In one aspect of the invention, database 211 can be a remote datastore connected to server 101.

Processor 201 may be configured to perform tasks such as decomposing the animation presentations into primitives and sending the animation primitives stored in database 211 to multiple client computing devices using communications interface 205, receiving edits to animation presentations stored in database 211 from client computing devices, and determining parameters for various presentation technology applications supported by browser applications running on the client computing devices. Processor 201 may be configured to ensure that animation presentations stored in database 211, and distributed to different computing devices having various browser applications, will have uniform appearance across the client computing devices by decomposing the animation presentations into primitives that are dependent on the presentation technology used by the browser applications.

Processors suitable for the execution of a computer program include, by way of example, both general and special purpose microprocessors, and any one or more processors of any kind of digital computer. Processor 201 may be a processing unit, a field programmable gate array, discrete analog circuitry, digital circuitry, an application specific integrated circuit, a digital signal processor, a reduced instruction set computer processor, an AVR processor, etc. Processor 201 may access a computer application program stored in non-volatile internal memory (e.g., ROM 207), RAM 209, or stored in external memory. When executed, the computer application program may cause processor 201 to perform one or more methods in accordance with an embodiment of the invention, as described below.

Generally, a processor will receive instructions and data from RAM or ROM or both. The essential elements of a computer are a processor for performing instructions and one or more memory devices for storing instructions and data. Computer-readable media suitable for storing computer program instructions and data, such as database 211, include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

Systems and methods in accordance with one or more aspects of the invention implement animations by decomposing each animation into a small set of animation primitives. Each primitive may have a start and end time and a start and end value. The times can be, for example, in the range [0, 1], where 0 is the beginning of the animation and 1 is the end. The start and end values may be dependent on the type of primitive. For example, a rotation primitive has start and end degree values, while a translation primitive has start and end coordinates.

In accordance with an embodiment of the invention, primitives can be combined arbitrarily, so a small number of primitives are enough to produce a very large array of various animation presentations. Because animations break down into primitives, browser inconsistencies can be resolved at the primitive level. A different implementation of each primitive could be necessary for each browser, but a different implementation of each animation may not be necessary. Once a full set of primitives is implemented, new animations can be created using those primitives without requiring any extra browser compatibility work. Animations can be expressed as a combination of a small number of animation primitives. If those primitives work cross-browser, any animation made up from them automatically does as well. New animations can be added without worrying about browser compatibility as long as they can be expressed in terms of the primitives.

FIGS. 3A-3K illustrate representative primitives in accordance with the invention. Each primitive has associated parameters that describe the action that the primitive undergoes when operated on by the browser-dependant presentation technology.

Figure 3A:
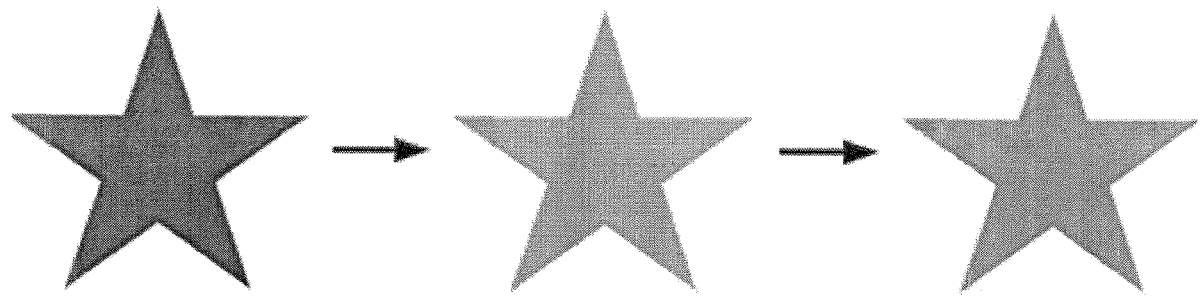
FIGS. 3A-3K illustrate a sampling of primitives in accordance with an embodiment of the invention.
Figure 3B:
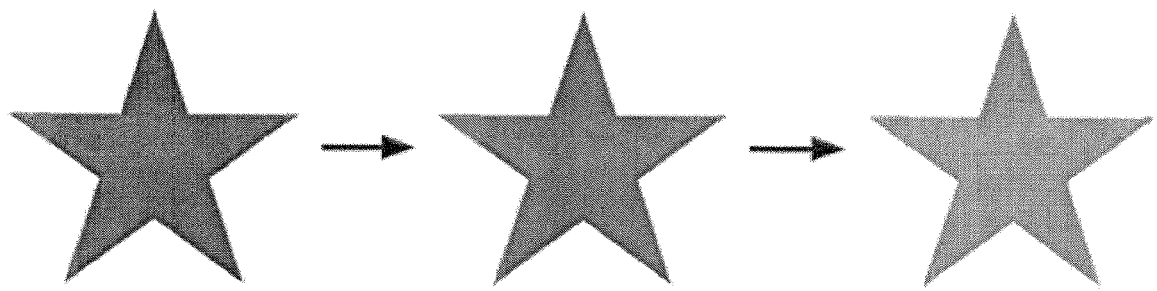
Figure 3C:
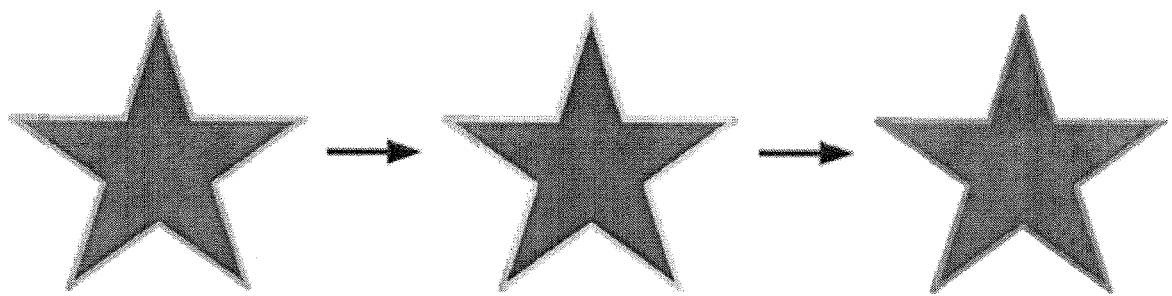

FIG. 3A illustrates the primitive fillColor(from→to). FillColor changes a shape's fill color (represented in grey scale in FIG. 3A). The "from" and "to" parameters represent color values. The shape's original fill color is represented by 'SHAPE_FILL_COLOR'—e.g., fillColor (SHAPE_FILL_COLOR→green). FIG. 3B illustrates the primitive filter(name), which applies a named filter to the shape. Filters manipulate objects on the pixel level, modifying color and/or opacity—e.g., filter(Desaturate). FIG. 3C illustrates the primitive lineColor(from→to). LineColor changes a shape's line color, where the parameters "from" and "to" are color values. The shape's original line color is represented by the parameter 'SHAPE_LINE_COLOR'—e.g., lineColor(SHAPE_LINE_COLOR→green).

Figure 3D:
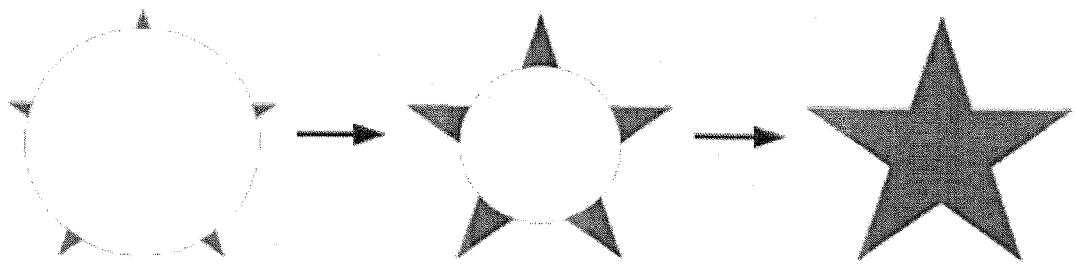

FIG. 3D illustrates the primitive mask(name), which applies a named mask effect to the shape (for example, a circular mask). Mask effects make some part of the image transparent. A mask can be thought of as a shape that lies on top of the animated shape and defines which portions of it are visible and/or hidden. One graphical element is used to define the visible part of another. So if B masks A, only the part of A intersecting with B is displayed. More precisely, the parts of A where B is opaque are opaque in the final image, and the parts of A where B is transparent are transparent in the final image. If B were semi-transparent in some places, the resulting image would also have semi-transparent places. To apply a mask, an element sets its 'mask' property to the ID of some 'mask' element.

Any animation where the graphic appears in parts (e.g., presentation graphics program effects such as: wipe, random bars, checkerboard, etc.) is using a mask. Importantly, some of those animations are just one of the other animation primitives applied to the mask instead of the animated object. For example, Wipe is a rectangular mask that is translated across the object. Similarly, Checkerboard is a mask made out of many rectangles that are scaled across the object. So, if translate and scale can be implemented with SMIL, then these animations can be implemented with SMIL as well.

Random Bars, on the other hand, does not cleanly break down into the other animation primitives. The name implies that the bars are generated programmatically using a random number generator. Animations like this cannot be implemented using SMIL, though it might be possible to make a deterministic version that looks random enough. In general, mask animations, like Random Bars, that cannot be expressed as animation primitives acting on the mask can need their own rendering logic. This makes each one its own animation primitive.

Figure 3E:
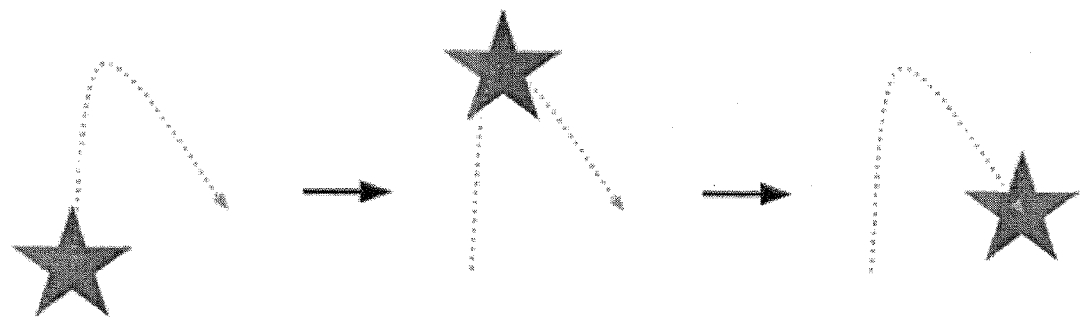
Figure 3F:
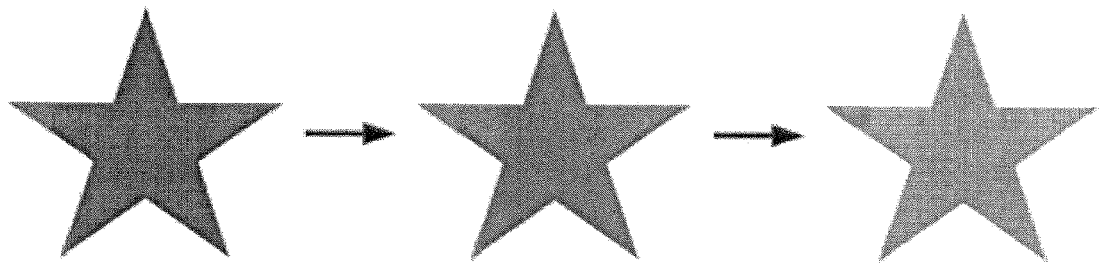

FIG. 3E illustrates the primitive motionPath(path). The primitive motionPath moves a shape along a given path—e.g., motionPath(Hook), which causes the shape to move along the dotted lines shown in FIG. 3E. The primitive opacity (from→to) is illustrated in FIG. 3F. Opacity changes the opacity (or transparency) of the shape. The parameters "from" and "to" can be numbers between 0 and 1, inclusive.

At one range, the shape would be rendered completely transparent, at the other end of the range the shape would be opaque—e.g., opacity(1→0.5).

Figure 3G:
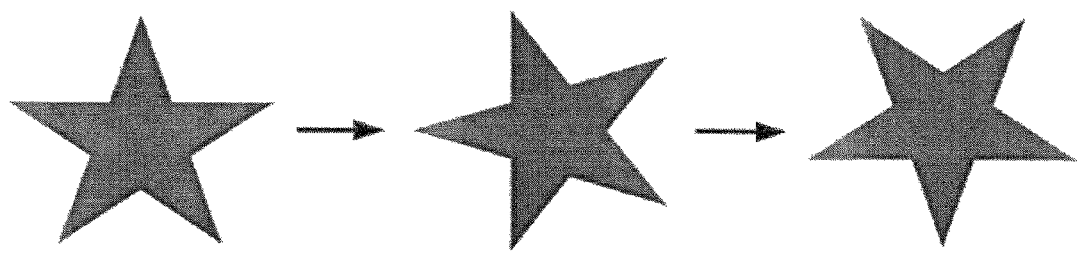
Figure 3H:
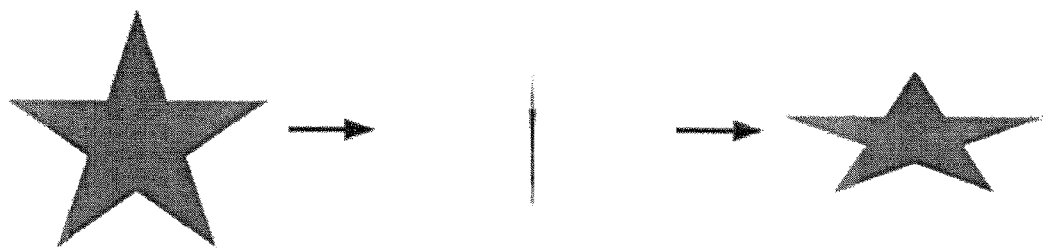

FIG. 3G illustrates the primitive rotate(from to) rotates the shape. The shape would be rotated from its initial "from" orientation to another position given by the "to" parameter ("from" and "to" can be expressed in degrees, radians, etc.), where 0° corresponds to the rotation at which the shape was placed on the slide. Positive values indicate a counter-clockwise rotation, and negative values a clockwise one—e.g., rotate(0°→180°). FIG. 3H illustrates the primitive scale (from$_x$→to$_x$, from$_y$→to$_y$). The primitive scales the shape in the x and y directions, where the parameters "from$_x$," "to$_x$," "from$_y$," and "to$_y$" are real numbers. A value of 1 corresponds to the original size. Values greater than one correspond to an increase in size. Values between 0 and 1 correspond to a decrease in size. Values less than 0 perform a reflection—e.g. scale(1→−1, 1→0.5).

Figure 3I:
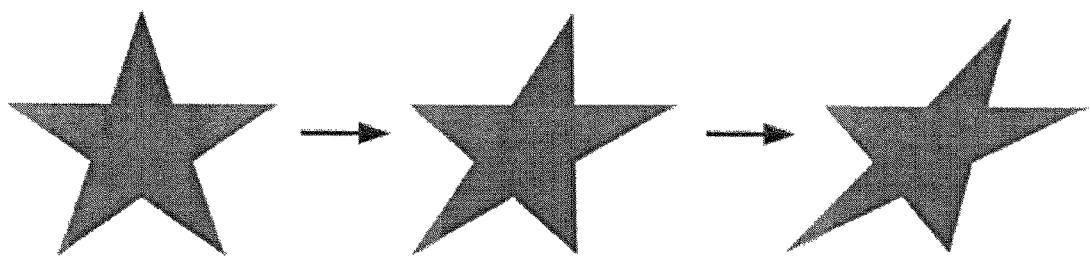
Figure 3J:
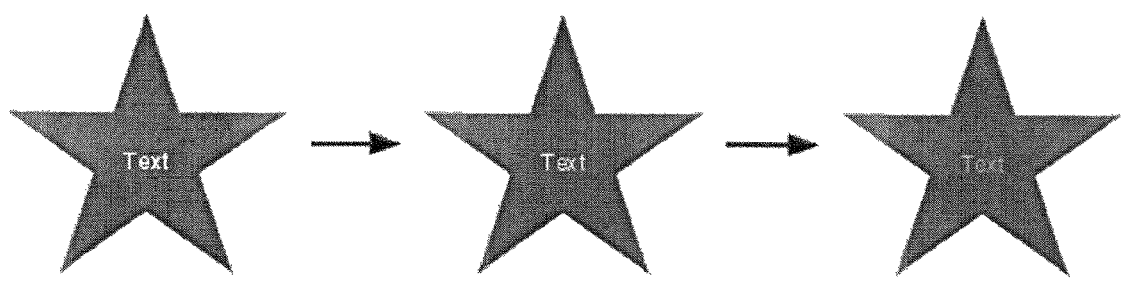
Figure 3K:
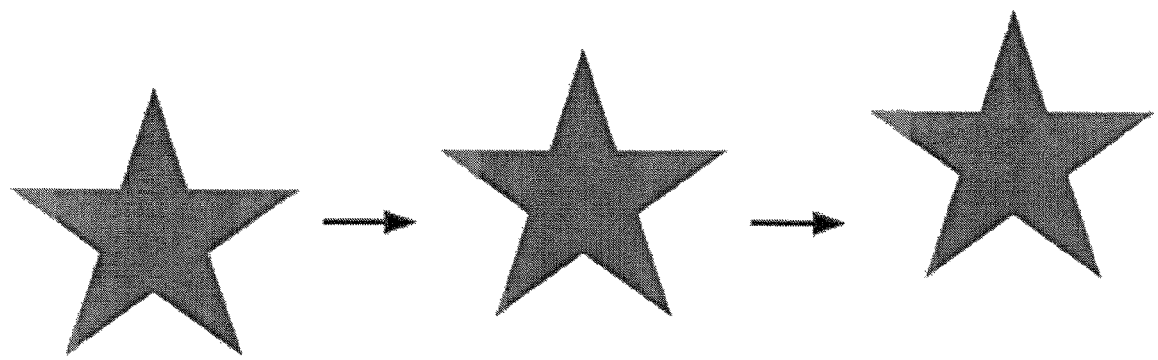

FIG. 3I illustrates the primitive skew(from$_x$→to$_x$, from$_y$→to$_y$). The primitive skews the shape in the x and y directions, where the parameters "from$_x$," "to$_x$," "from$_y$," and "to$_y$" can be expressed in degrees, RADIANS, etc. A value of 0° corresponds to the skew at which the shape was placed on the slide. Positive values indicate a counter-clockwise skew, and negative values a clockwise one—e.g., skew(0°→−30°, 0°→0°). FIG. 3J illustrates the parameter textProperty (from→to), which changes a text property of a shape. The parameters "from" and "to" can be 'bold', 'underline', 'italic', a color value, etc. The shape's original text color is represented by 'SHAPE_TEXT_COLOR'—e.g., textProperty(SHAPE_TEXT_COLOR→green). FIG. 3K illustrates the parameter translate(from$_x$→to$_g$, from$_y$→to$_y$). The primitive translates the shape in the x and y directions. The parameters "from$_g$," "to$_x$," "from$_y$," and "to$_y$" can be expressed as percentages, ratios, etc. A parameter value of (0,0) corresponds to the position at which the shape was placed on the slide. Parameter values are in terms of the page width/height. For example, a parameter value (100%, 100%) corresponds to a position off of the bottom, right corner of the page, and a parameter value of (−100%, −100%) corresponds to a position off of the top, left corner—e.g., translate(0→0, 0→−10%).

For browsers without SVG support (e.g., Internet Explorer versions prior to ver. 9.0) animations can be displayed by a sequence of rendered PNGs from server 101. This approach could still accommodate opacity changes by using Javascript/CSS to change the opacity of entire images. Other animations could be simulated by rendering PNGs of a page as it appears in the middle of an animation and then fading between those interpolated images. However, this would require downloading extra images, which may be too expensive for what is still a loss of fidelity.

SMIL is a language for declaratively defining animations directly in SVG. For example, a rectangle fading out over 5 seconds after a 10 second delay can be expressed with:

<rect>
<animate attributeType="CSS" attributeName="opacity"
from="1" to ="0" dur="5 s" begin="10 s"/>
</rect>

This approach can be used to animate most of the CSS properties and XML attributes of SVG elements. The animation is handled by the browser, which means it doesn't rely on the JavaScript thread for timing. The begin attribute can also include events like 'click' in its value. For example, a begin value of "click+5 s" would start the animation 5 seconds after a click. Animation elements can also be accessed with Javascript through the document object module (DOM) and started programmatically. Unfortunately, SMIL is not supported very consistently across browsers.

For browsers that support SVG, but not SMIL, Javascript can imitate in code what SMIL does declaratively. The code could use setTimeout to update the relevant SVG attributes or style properties incrementally between their initial and final values. The downside of this approach is that the animations are tied to the Javascript thread. Their performance can depend heavily on Javascript performance. Nonetheless, JavaScript animations do allow browsers with SVG support, but no SMIL support to have essentially the same animations.

CSS3 provides an alternative to SMIL for defining animations declaratively. The approach is somewhat different. First, the CSS property to be animated is declared and given a duration:

.fade {
transition-property: opacity;
transition-duration: 2 s;}

Now, whenever the opacity value of an element with the 'fade' class is changed via Javascript, instead of updating the value immediately, the browser will change it gradually over 2 seconds. As with SMIL, the browser times the animation. Javascript is used to set the final value. The CSS approach could be considered simpler than SMIL, though not as powerful.

Unlike SMIL, CSS transitions can only be used to animate style properties, not XML attributes. For SVG, that is a somewhat limited set of properties. Notably, SVG transforms (rotate, scale, skew, translate) cannot be modified with style properties. Also, the usual style properties for positioning (left, right, top, bottom) have no effect on SVG elements. In other words, CSS transitions cannot represent all of the animation primitives. In accordance with an aspect of the invention, a workaround to this limitation of CSS is to wrap animated shapes in an HTML div element inside a foreignObject element inside the SVG. The div element could then be styled using the top, left, etc. style properties, and those style properties could be animated using CSS transitions. However, it is noted that this approach significantly increased the complexity of an approach which has simplicity as one of its main benefits. Ultimately, until the gap between CSS and SVG is filled in, CSS transitions may not be the best approach for implementing animation primitives on SVG. It could, however, be used to animate opacity transitions on PNGs for browsers that don't support SVG, but do support CSS Transitions.

In accordance with an embodiment of the invention, the primitives fillColor, lineColor, and opacity can be implemented with SMIL, SVG+JS or CSS3 transitions. With SMIL, opacity can be animated using the 'animate' element. Primitives fillColor and lineColor can use the 'animateColor' element instead, because their values are colors, but the behavior of the two elements is essentially the same. This code animates the fill color between two colors over a two second period:

<animateColor ID="fillColorAnim" attributeType="CSS"
attributeName="fill" from="rgb(0,255,0)" to="rgb(11, 83,148)" dur="2 s" begin="indefinite"/>

The 'indefinite' begin value means that the animation will only be started programmatically, and so the element also has an ID to make accessing it from Javascript easier.

With SVG+JS, the same interpolation that the browser would take care of in the SMIL case is done in Javascript. The SVG element's style properties are updated at regular intervals with repeated calls to setTimeout until the animation is over. With CSS3 transition, the transition-duration property is first set so that the browser knows to change properties gradually. Then the appropriate style property is changed to start the animation.

In accordance with an embodiment of the invention, the primitives rotate, scale, skew, translate can be implemented with SMIL and SVG+JS. With SMIL, all four can be animated using the 'animateTransform' element. This code rotates an element 180° over a two second period:

<animateTransform ID="rotateAnim" attributeName="transform" attributeType="XML" type="rotate" from="180" to ="0" dur="2 s" begin="indefinite" additive="sum"/>

The type is one of 'rotate', 'scale', 'skewX', 'skewY' and 'translate'. The 'attributeName' specifies that this animation is acting on the 'transform' attribute of the element it is animating. The 'transform' attribute is a list of transformations (e.g. [rotate(90), scale(0.5), translate(0, 100)]). The 'additive' property specifies whether the 'transform' attribute is overwritten by this animation, or whether the animation just adds to the list. A value of 'replace' indicates the former, and 'sum' the latter. For these primitives, 'sum' is the appropriate value, because the animation shouldn't override any transformation that was already applied to the shape.

With SVG+JS, Javascript handles the interpolation of the transform. A new transformation is added to the 'transform' attribute and this transformation is updated at regular intervals with repeated calls to setTimeout until the animation is over.

The primitive motionPath can be implemented with SMIL and SVG+JS. With SMIL, motionPath can be implemented using the 'animateMotion' element. This code moves an element along the path with the ID 'motion':

<animateMotion dur="2 s" begin="indefinite">
        <mpath xlink:href="#motion"/>
    </animateMotion>

With SVG+JS, Javascript interpolates a value between 0 and the length of the motion path. That value is then turned into a point using the path element's getPointAtLength method. At each animation step, the animated SVG element's 'transform' property is updated to move it to that point, in much the same way it would be during a translate animation.

The primitive filter can be implemented with SMIL and SVG+JS. Filter operates on the rendered pixels of SVG elements, to produce effects—for example, brightening, blurring and specular lighting. SVG provides several different filters with varying cross-browser support. Their attributes can be animated with the SMIL 'animate' element or with Javascript, in the same way as previous element attributes.

The primitive textProperty can be implemented when text is rendered into the SVG as paths (in the viewer), then the text's color can be manipulated in the same ways as fill and line color. When the text is rendered to canvas (in the editor), the text would be animated with Javascript regardless of SMIL support. The canvas would be re-rendered at each step of the animation. For bold, underline, and italics interpolation between values might not be possible. So text would move directly from normal to italic, for example, rather than slanting gradually. In the SVG paths case, this would mean swapping in new paths for the text. In the canvas case, this would mean re-rendering. Animations on text may be organized into sub-parts (e.g. animating by letter, by word, or by bullet), therefore changes would be required to allow rendering text that has sub-parts in different animation states.

In accordance with an embodiment of the invention, animations are stored in an ordered list on each page. Each animation references the ID of the drawing object it animates and has a map of properties specifying how the animation behaves. This structure simplifies the animation commands and their transformation logic. A single animation applied 'by word' could correspond to animating several attributes on the paths for each word, timed so the words appear one by one. In order to actually display them, the animations must be rendered into a representation that describes how they will act on the rendered image rather than on the model, and the rendered image must provide access to the animated parts.

Figure 4:
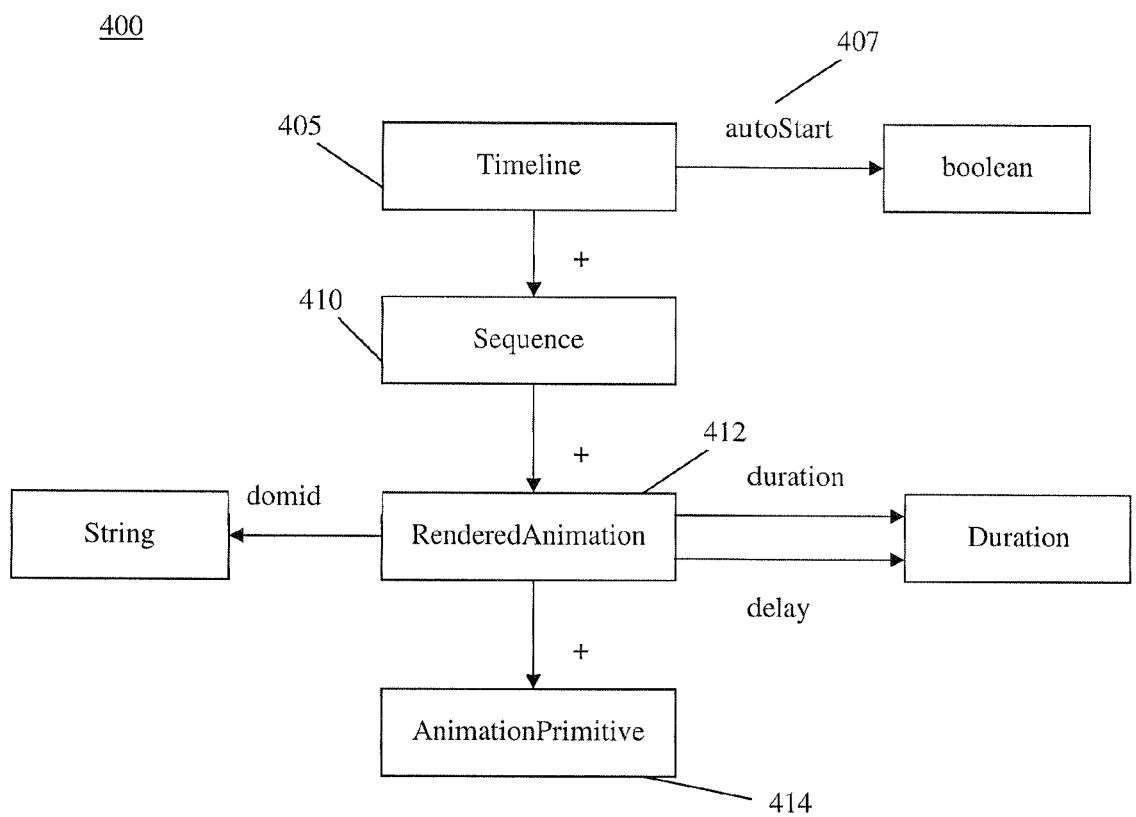
FIG. 4 illustrates a page structure for an animation rendering in accordance with an embodiment of the invention.

FIG. 4 illustrates a page structure 400 for an animation rendering in accordance with an embodiment of the invention. Timeline 405 contains all of the animations on a page. It is an ordered list of sequences, each triggered by a successive click in the viewer. The autoStart flag 407 specifies whether the first sequence is triggered automatically when the page is initially displayed. Sequence 410 is a set of RenderedAnimations 412, all of which are triggered to start when the sequence is started. However, since RenderedAnimations can specify a delay, they do not necessarily start playing at the same time.

In accordance with an embodiment of the invention, RenderedAnimation 412 is a set of animation primitives that apply to a particular (DOM) element. Parameters within the RenderedAnimation specify the duration over which the animation primitives act and a delay to wait between being triggered and starting to play. AnimationPrimitive 414 represents one of the primitives (described above). Each primitive specifies a start and end time between 0 and 1, which is scaled by its parent RenderedAnimation 412 to a duration in seconds.

The page structure 400 does not include the start condition or iteration type properties of the model animations. The start condition either determines which sequence the rendered animation goes in, or its delay in that sequence. The iteration type turns a single model animation into several rendered animations—one for each part (e.g., word, paragraph, etc.) of the animated shape. Every rendered animation has an explicit position in the timeline and animates exactly one object in the rendering.

Figure 5:
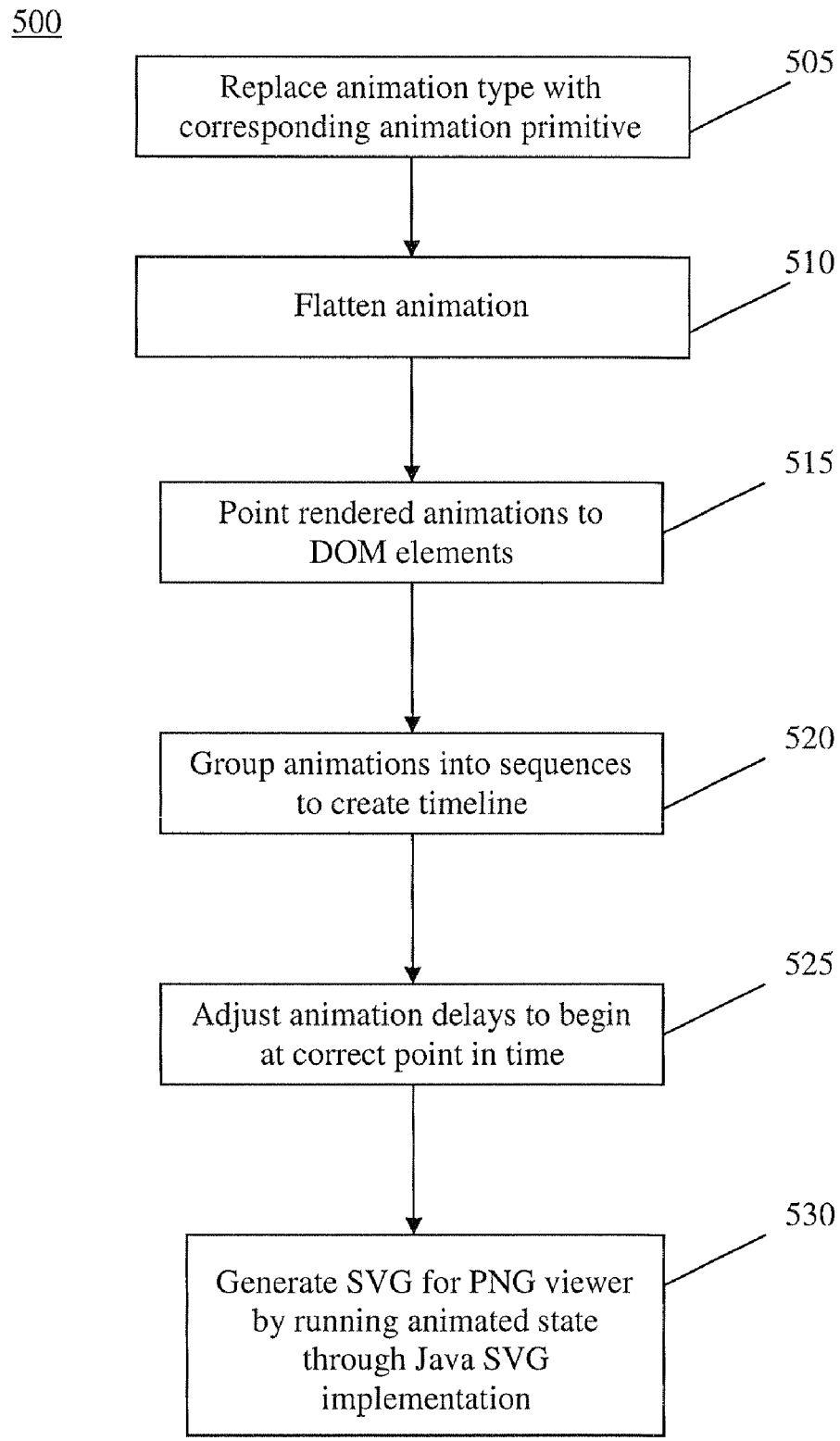
FIG. 5 illustrates a process in accordance with an embodiment of the invention.

FIG. 5 illustrates process 500 in accordance with an embodiment of the invention. Process 500 assigns animation primitives by replacing, step 505, each animation's type with the animation primitives that correspond to that type. Process 500 continues at step 510, where the animations are flattened. The flattening step applies to those animations that affect parts of an object. For example, an animation might be a "Fly in from left, by paragraph." The end result is that rather than the animated shape flying in from the left, each paragraph of text in the shape flies in from the left. The flattening step takes one such animation and flattens it out into multiple rendered animations, each of which corresponds to just one of the paragraphs. The animated parts of the shape could be sections of text (e.g., Paragraph, Line, Word, Letter, etc.), or they could be parts of the shape (e.g., Outline, Fill, etc.). One animation can iterate over multiple objects, but the rendered animations produced by process 500 can apply to a single DOM element corresponding to a single paragraph, word, letter, etc. After the drawing objects on a page are rendered, the animations are updated, step 515, to point to the rendered DOM elements instead of the animated shape. The copies are identical to the original except for the element that they point to.

To create the timeline 405 the animations are grouped into sequences, step 520, based on their start conditions. There will be one sequence for every animation that starts 'on click'. All animations that start 'after previous' or 'with previous' are put in the same sequence as the first 'on click' animation that precedes them. The delays of the animations within the sequence are adjusted (if needed), step 525, so that they begin at the correct point in time. If the first animation does not start 'on click', any animations before the first 'on click' animation are put in their own sequence, and the timeline autoStart flag 407 is set to true.

For the PNG viewer, a PNG is generated, step 530, from the SVG state of the model before any animations and at the end of every sequence. Having a frame at the end of every sequence is just one possible way to break the animation up into images. This is a good balance between showing enough change and not creating too many images. These images can be generated by running the animated state of the SVG through a Java SVG implementation. For browsers that do not support SVG, the appropriate SVGs thus can be produced on server 101, and then a rendering of that SVG in PNG format is sent to the client computing device. Since the PNG viewer will operate on these images rather than the SVG rendering, a new timeline 405 is created that just fades in successive images.

In the SVG cases, the viewer will request a page and receive a JavaScript Object Notation (JSON) response with the animation-ready SVG, and the serialized timeline. The timeline is de-serialized and used to update the SVG to the state it should be in before the animations play. Then the SVG can be displayed, and the timeline can be used to play the animations.

In the PNG case, the server's JSON response cannot contain the actual images. Instead it can contain, along with the timeline, a map from image ID to a URL for that image. The image IDs can be referenced in the timeline, but it may be up to the viewer to create the DOM image elements for the URLs and assign them the appropriate IDs. Once the image elements are created, the timeline can be used to advance the animation, just as in the SVG case.

Client computing device 103, 105, 107, 109 receives Timeline 405 from server 101 and applies the animations to the rendered elements. This process may be divided among three classes—AnimationPlayer(timeline), SequencePlayer(sequence), and PrimitiveApplier( )

The AnimationPlayer is the top level object used by the viewer, and keeps track of the currently playing sequence.

init( ) creates a SequencePlayer for each sequence in the timeline and calls gotoStart;

next( ) calls gotoEnd on the current SequencePlayer, and plays the next one;

previous( ) calls gotoStart on the current SequencePlayer.

The SequencePlayer is responsible for running the animation loop to play sequences.

gotoStart( ) applies the primitives in all of the rendered animations in the sequence at time 0;

play( ) starts an animation loop that applies primitives at the appropriate time;

gotoEnd( ) applies the primitives in all of the rendered animations in the sequence at time 1.

The PrimitiveApplier is responsible for modifying the DOM based on an animation primitive.

apply(element, primitive, time) applies a primitive to an element at a time between 0 and 1.

In the PNG case, the server must also be able to apply primitives, so that it can produce the images. However, it does not need to maintain a current sequence or an animation loop. Therefore, the server will have a PrimitiveApplier, just like the one on the client, but not the other two classes. The server can apply all of the primitives in the timeline at time 0 to produce the first image. Then for each sequence, it can apply all of the primitives in that sequence at time 1 to produce each of the successive images.

The simplest way to preview animations in the editor is to get the SVG rendering and timeline from the server (just like in the viewer) and replace the editing surface with the animated rendering. All of the viewer classes could be reused, so this approach would require little extra code beyond what is already in the viewer. However, every time the document is changed and an animation is previewed, a server request may need to be made. Depending on the connection speed and the size of the rendered SVG, this might not be user-noticeable, but it does create traffic between client and server.

In accordance with an aspect of the invention, one possible optimization is to separate the rendering of the SVG and the timeline. Since the SVG rendering needs text paths, it needs to be done on the server. However, the timeline could be generated on the client computing device. As long as the client and server use the same method for assigning IDs, the client-generated timeline should match up to the server generated SVG. With this approach, the SVG would need to be fetched when any animated drawing objects are modified, or if an animation's iteration type is changed. But, if a user just wants to try out a few different animations on an object, server requests may not be necessary. This approach would require duplicating the animation rendering logic on the client computing device.

If text could be rendered using the SVG <text> element, then the server may not be needed to render the text paths. The server would still need to provide word-widths to provide consistent line-breaks, but this is substantially less traffic then the SVG paths. With this change, the client computing device could render both the SVG and the timeline, so animations could be previewed without any server requests.

Figure 6:
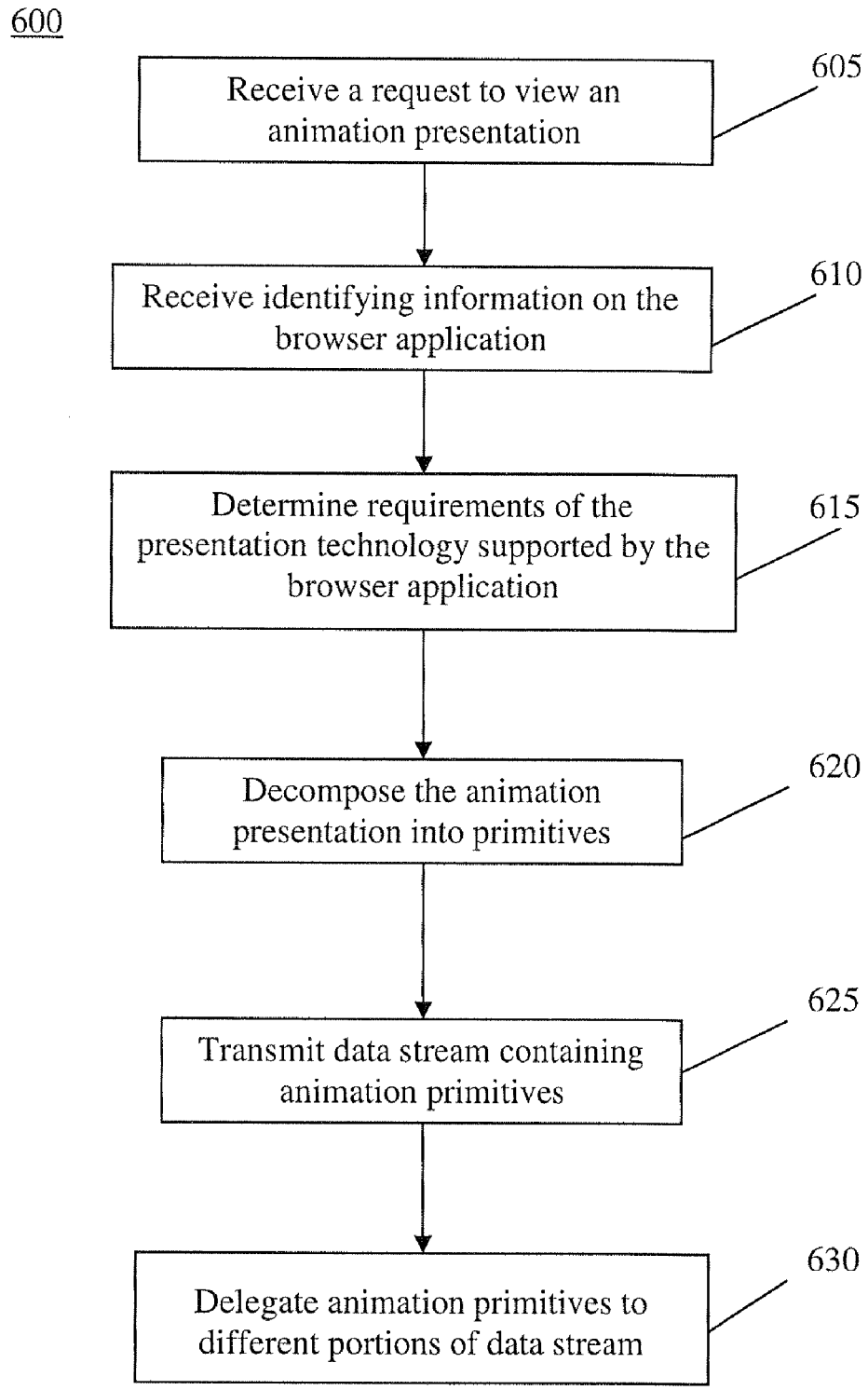
FIG. 6 illustrates a process in accordance with an embodiment of the invention.

FIG. 6 illustrates process 600 in accordance with an embodiment of the invention. Process 600 renders an animation presentation by decomposing the presentation into primitives. The server receives a request, step 605, to view the animation presentation on the computing device. The animation itself may be resident in a storage device accessible by the server. Information identifying the browser application running on the computing device where the animation is to be presented is received, step 610, by the server. The server determines, step 615, the requirements of the presentation technology supported by the identified browser application. The animation presentation is decomposed, step 620, at the server into animation primitives compatible with the presentation technology supported by the browser application—i.e., performing process 500 (FIG. 5), which produces page structure 400 (FIG. 4). Each of the animation primitive has parameters identifying a start time, an end time, and/or an end value. A data stream containing the animation primitives is transmitted, step 625, to the computing device. The data stream can include an expression of the animation presentation as a combination of the animation primitives. Depending on the browser application's formatting, transfer, and other requirements, the animation primitives can be delegated, step 630, to different portions of the data stream. The presentation technology features can be used to resolve inconsistencies among a plurality of different browser applications requesting the same animation presentation. A second animation can be rendered by expressing the second animation in terms of an altered combination of the animation primitives. Alternatively, the animation can be altered by including one or more additional animation primitives in the data stream.

In accordance with an embodiment of the invention, a computer program application stored in non-volatile memory, or computer-readable medium (e.g., hard drive, flash memory, CD ROM, magnetic media, etc.) may include code or executable instructions that when executed may instruct or cause a controller or processor to perform methods discussed herein such as a method of rendering an animation presentation on a computing device by decomposing the animation presentation into primitives.

While there have been shown and described fundamental novel features of the invention as applied to one or more embodiments, it will be understood that various omissions, substitutions, and changes in the form, detail, and operation of these embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A computer-implemented method for rendering an animation presentation on a computing device in communication with a server, the method comprising:
   receiving, at the server, a request to view the animation presentation on the computing device;
   obtaining, at the server, information identifying a browser application running on the computing device;
   determining, at the server, requirements of a presentation technology supported by the identified browser application;
   decomposing, by the server, the animation presentation into animation primitives compatible with the presentation technology supported by the browser application; and
   generating, storing in memory, and transmitting to the computing device a data stream containing the animation primitives,
   wherein the transmitting step includes delegating the animation primitives to different portions of the data stream dependent on parameters of the identified browser application.

2. The method of claim 1, wherein each animation primitive has at least one of a start time, an end time, and an end value.

3. The method of claim 1, further including rendering a second animation by expressing the second animation in terms of an altered combination of the animation primitives.

4. The method of claim 1, further including altering the animation by including one or more additional animation primitives in the data stream.

5. The method of claim 1, wherein the data stream includes an expression of the animation presentation as a combination of the animation primitives.

6. The method of claim 1, wherein the decomposing step applies the supported presentation technology features to resolve inconsistencies among a plurality of browser applications.

7. A computer-implemented method for rendering an animation presentation on a computing device in communication with a server, the method comprising:
   replacing an animation type within an animation page structure of the animation presentation with an animation primitive;
   flattening at least a portion of the animation presentation into multiple rendered animations;
   updating drawing objects of the animation page structure to point to a rendered document object;
   grouping two or more animation primitives into sequences to create a timeline for the animation page structure; and
   adjusting delays of the multiple rendered animations to begin at a correct point in time;
   generating, storing in memory, then transmitting to the computing device a data stream containing the multiple rendered animations based on the adjusted delays.

8. The method of claim 6, wherein the animation primitive corresponds to the animation type.

9. The method of claim 6, wherein the updating step is repeated for each iterated animation portion.

10. The method of claim 6, wherein one sequence is created for each animation that starts 'on click'.

11. The method of claim 9, wherein each animation that starts 'after previous' or 'with previous' is placed in the same sequence as the first preceding 'on click' animation.

12. The method of claim 6, wherein if the first animation does not start 'on click', any animations before the first 'on click' animation are put in their own sequence.

13. The method of claim 11, wherein a timeline automatic start flag is set to true.

14. The method of claim 6, wherein a portable networks graphic (PNG) image is generated for a PNG viewer from a scalable vector graphic (SVG) state of the model before any animations and at the end of every sequence.

15. The method of claim 6, wherein for a PNG viewer the method includes generating images by running an animated state of a SVG through a Java SVG implementation.

16. A non-transitory computer readable program encoded in a non-transitory computer readable medium comprising:
   an executable computer program code configured to instruct a system to render an animation presentation on a computing device in communication with a server, the executable computer program code comprising the steps of:
   receiving, at the server, a request to view the animation presentation on the computing device;
   obtaining, at the server, information identifying a browser application running on the computing device;
   determining, at the server, requirements of a presentation technology supported by the identified browser application;
   decomposing, by the server, the animation presentation into animation primitives compatible with the presentation technology supported by the browser application; and
   generating and transmitting to the computing device a data stream containing the animation primitives,
   wherein the transmitting step includes delegating the animation primitives to different portions of the data stream dependent on parameters of the identified browser application.

17. The non-transitory computer readable program of claim 15, wherein the decomposing step applies the supported presentation technology features to resolve inconsistencies among a plurality of browser applications.

18. The non-transitory computer readable program of claim 15, further including instructions configured to alter the animation by including one or more additional animation primitives in the data stream.

19. The non-transitory computer readable program of claim 15, further including instructions configured to render a second animation by expressing the second animation in terms of an altered combination of the animation primitives.

20. A system for rendering an animation presentation, the system comprising:
   a server in communication with one or more computing devices connected to an electronic communication network;
   the server including a processor, an input/output device in communication with the electronic communication network, and a database having stored therein one or more animation presentations;

the processor, connected to the input/output device and the database, configured to:
   receive a request to view at least one of the animation presentations;
   obtain information identifying a browser application running on the computing device;
   determine requirements of a presentation technology supported by the identified browser application;
   decompose the animation presentation into animation primitives compatible with the presentation technology supported by the browser application; and
   generate and transmit to the computing device via the input/output device a data stream containing the animation primitives and delegate the animation primitives to different portions of the data stream dependent on parameters of the identified browser application.

21. The system of claim 18, wherein respective computing devices include differing presentation technologies, and the processor is configured to control decomposing of the animation presentation into animation primitives so that the rendering of the animation presentation on the differing presentation technologies will have uniform appearance.

22. The system of claim 18, wherein one or more users access the server using a computing device so as to view or edit the animation presentations stored in the database.

23. The system of claim 18, wherein the server is implemented as one of a single computing device and multiple distributed computing devices.

24. The system of claim 18, wherein the processor is configured to combine a plurality of animation primitives to produce an array of various animation presentations.

* * * * *